Dec. 22, 1936.  W. W. HARRIS  2,065,071
VEHICLE WHEEL SUSPENSION
Filed July 12, 1934  3 Sheets-Sheet 1
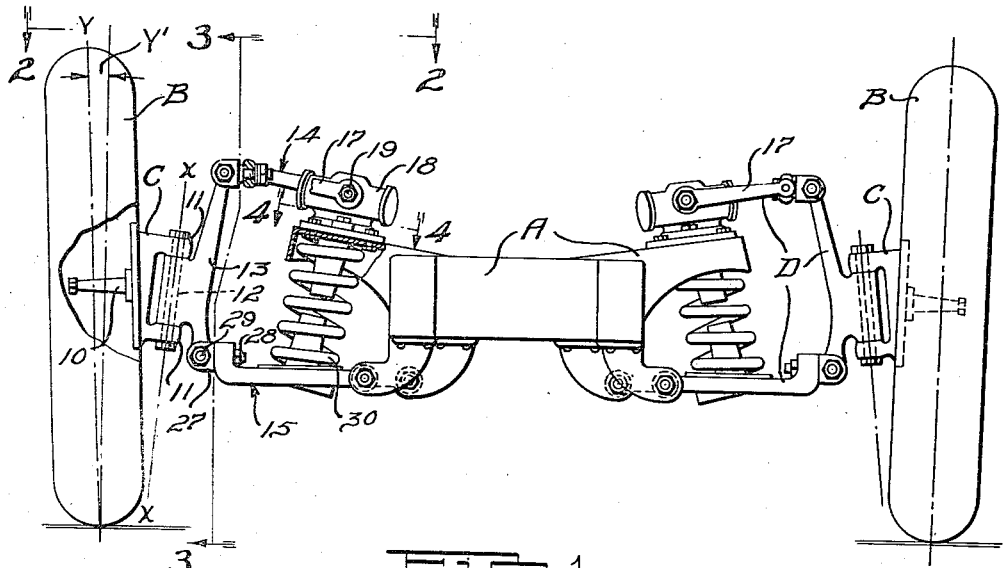
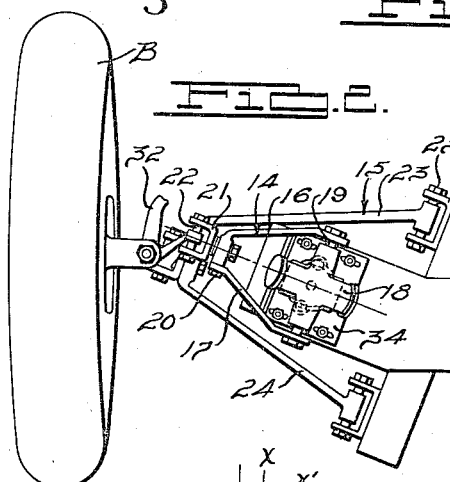
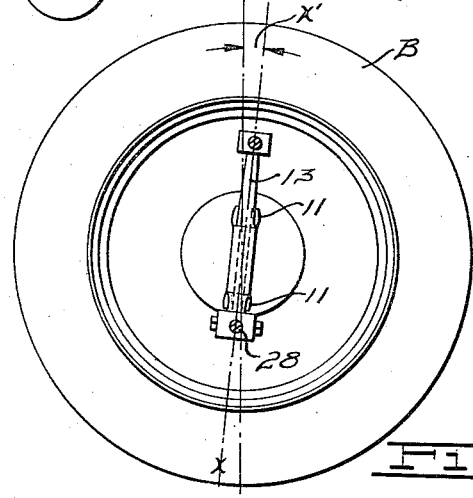
INVENTOR
William W. Harris
BY
Harness, Lind, Pates & Harris
ATTORNEYS.

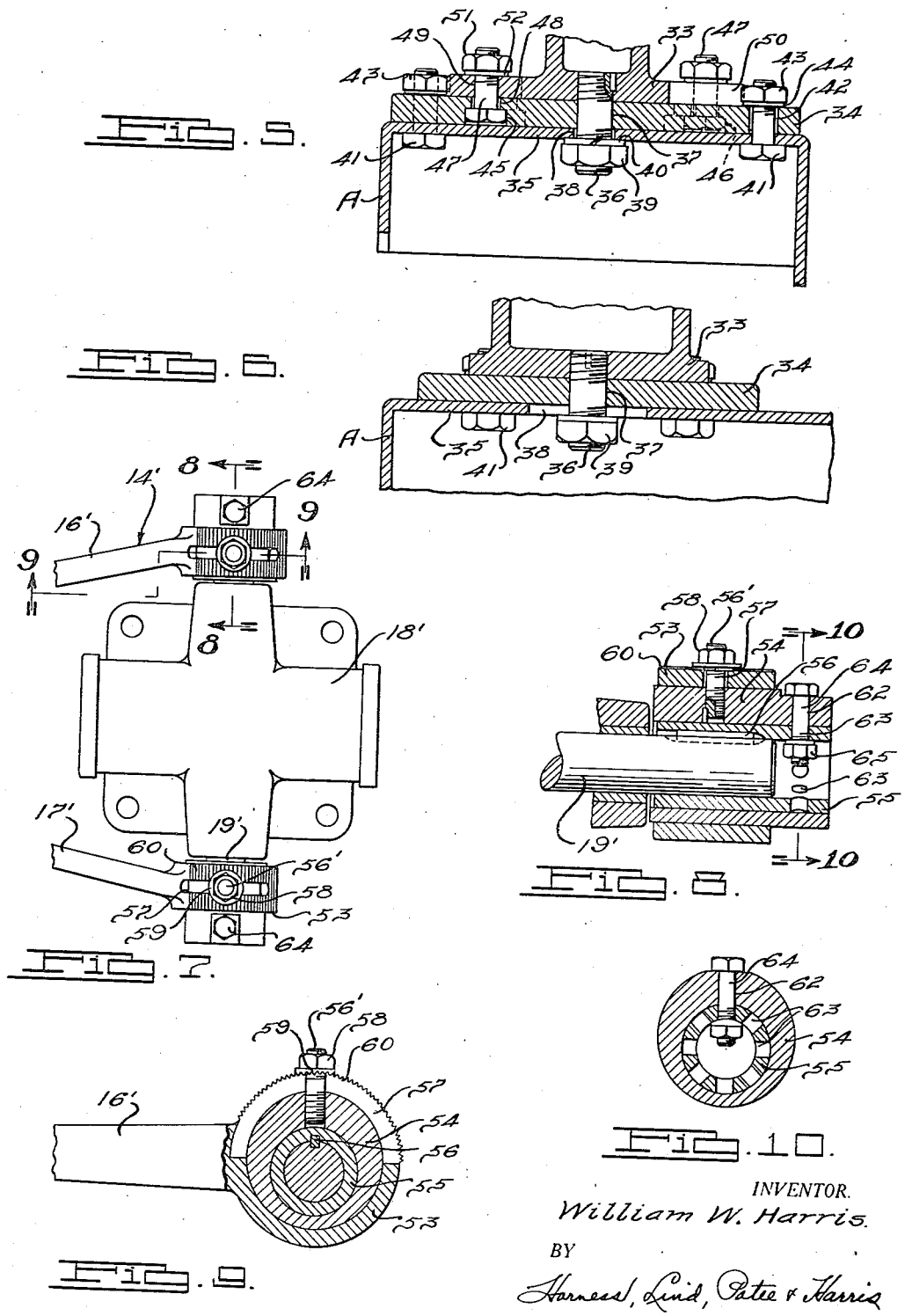

Dec. 22, 1936.   W. W. HARRIS   2,065,071
VEHICLE WHEEL SUSPENSION
Filed July 12, 1934   3 Sheets-Sheet 3
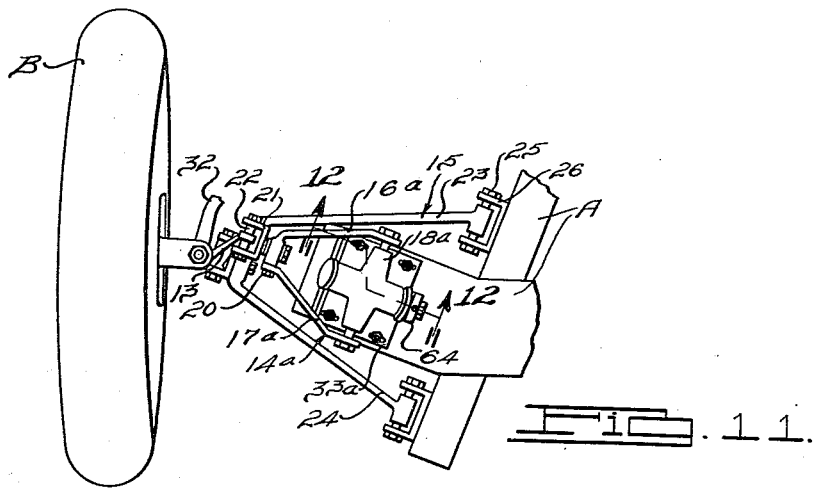
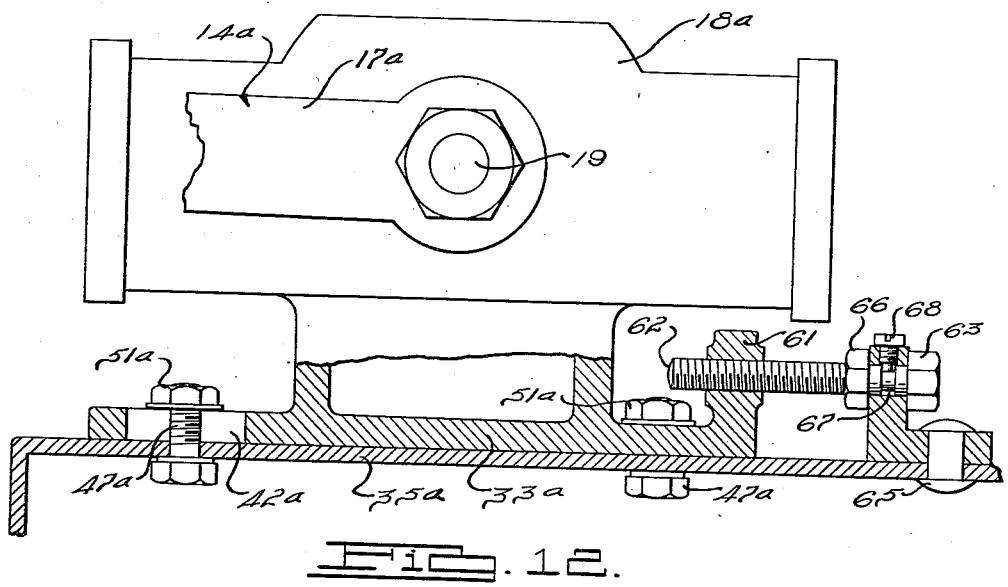
INVENTOR.
William W. Harris.
BY
Harness, Lind, Patee & Harris
ATTORNEYS.

Patented Dec. 22, 1936

2,065,071

UNITED STATES PATENT OFFICE 2,065,071

VEHICLE WHEEL SUSPENSION

William W. Harris, Detroit, Mich., assignor to Chrysler Corporation, Detroit, Mich., a corporation of Delaware Application July 12, 1934, Serial No. 734,734

2 Claims. (Cl. 280—124)

This invention relates to wheel suspensions for vehicles and refers more particularly to so called independent wheel suspensions for motor vehicles.

In suspensions of the type mentioned above, it is important to provide a predetermined desired wheel alignment and in connection with the steering wheels it is particularly desirable to maintain accuracy in the mounting of such wheels to provide the desired degree of camber and caster. Failure to maintain the aforesaid characteristics may, and often does, result in excessive tire wear, difficult steering, shimmy or tramp of the steering wheel, and other undesirable effects.

In actual production difficulty has been experienced in maintaining the aforesaid characteristics in keeping with practical limitations, cost, workmanship, manufacturing tolerances, and the like.

It is an object of my invention to overcome the aforesaid undesirable effects and difficulties in an improved manner.

A further object of my invention resides in the provision of an improved wheel suspension particularly adapted for manufacture at relatively low cost.

A still further object of my invention resides in the provision of an improved wheel suspension capable of manufacture in keeping with ordinary practical limitations of manufacturing tolerances.

A further object is to provide improved means for adjusting a vehicle steering wheel for caster or camber or both by the provision of adjusting means associated with a shock absorber which operates to check the displacement of the wheel relative to the vehicle frame structure.

In carrying out the objects of my invention, I preferably provide suitable shock absorbing means in the wheel suspension mechanism together with means for adjustably shifting the position of the shock absorber mounting on the vehicle frame or else for shifting the linkage of the suspension mechanism at the connection thereof to the shock absorber actuating shaft for conveniently varying the normal position of the wheel to compensate for any inaccuracies introduced in the manufacture and assembly of the parts thereof. Thus, by reason of my novel compensating means, any inaccuracies in wheel camber and caster may be readily corrected.

Further objects and advantages of my invention will be apparent from the following detailed description, reference being had to the accompanying drawings, in which I have shown several forms which my invention may assume by way of example and illustration.

In the drawings in which like reference characters represent corresponding parts throughout the several views, Fig. 1 is a front elevational view of the forward vehicle steering wheels showing my improved suspension mechanism therefor.

Fig. 2 is a top plan view of my wheel suspension, the view being taken as indicated by the line 2—2 of Fig. 1.

Fig. 3 is a sectional elevational view through the line 3—3 of Fig. 1.

Fig. 4 is a sectional plan view of my shock absorber mounting, the section being taken along the line 4—4 of Fig. 1.

Figs. 5 and 6 are respectively detail sectional elevational views along the lines 5—5 and 6—6 of Fig. 4.

Fig. 7 is a plan view illustrating a modified form of my wheel suspension adusting means.

Figs. 8 and 9 are respectively detail sectional views along the lines 8—8 and 9—9 of Fig. 7.

Fig. 10 is a detail sectional elevational view along the line 10—10 of Fig. 8.

Fig. 11 is a plan view of a further modified shock absorber adjustable mounting.

Fig. 12 is a sectional elevational view along the line 12—12 of Fig. 11.

In the drawings, reference character A represents the frame or load carrying structure of the motor vehicle, the body, engine, and driving parts of the motor vehicle being omitted for clarity in my disclosure since such parts are well-known in the art and may be of any desired form and arrangement.

I have illustrated my invention in connection with the forward steering ground wheels B of the motor vehicle, each wheel being journaled on a spindle 10 of the wheel supporting means C. This wheel supporting means of each of the wheels B is also preferably formed with bearings 11 for receiving a kingpin 12 providing swiveling of the steering wheel about the axis X—X of the kingpin or steering knuckle pivot.

As the parts associated with each of the wheels B are similar, the description for the most part will be limited to one of the wheels and parts associated therewith.

The wheels B in their normal positions illustrated in Fig. 1 are preferably cambered so that the plane Y—Y of each wheel extends upwardly and outwardly at an inclination to the vertical, the camber angle being designated at Y' in Fig. 1. The desirability of camber for steering wheels is generally accepted and understood. The desirability of caster is also well understood and in Fig. 3 the caster angle is designated as X', this being the angle between the king pin axis X—X and the vertical as seen in side elevation.

In order to support the frame structure A by the wheels B and to provide substantially independent suspension or springing movement of each of the wheels relative to each other, I have provided the connecting means D intermediate the frame and the wheel supporting means C. This connecting means may be of any suitable form and arrangement for properly guiding displacement of the wheels B and in my present illustration includes an arm or steering knuckle bracket 13 associated with each of the wheels B, each arm being adapted to support or carry a king pin 12 by reason of the bearing portion thereof which lies between the space bearings 11.

Arm 13 extends generally vertically in the sense that the ends thereof are positioned in space relation, the connecting means D in the illustrated embodiment being arranged in a substantially trapezoidal shape. Thus, during a displacement of the wheel, the track between the wheels B remains practically unchanged when either wheel strikes a depression or encounters a bump in the roadway. The linkage or connecting means D, while of the general parallelogram type, is preferably arranged in the form of a rectangle and more particularly in the form of a trapezoid defined by various supports for the linkage parts. Extending generally laterally or transversely of the vehicle are the upper and lower guide linkages or connectors 14 and 15, respectively, these connectors being of the so-called wishbone type or generally V-shaped. Where the aforesaid trapezoidal arrangement of linkage is desired, connector 15 is somewhat longer than connector 14 as illustrated, this arrangement deviating somewhat from a true parallelogram but providing substantially vertically guided movement of the point of wheel tread contact with the ground on displacement of the wheel.

One of the connectors such as the connector 14 has its arms 16 and 17 thereof diverging toward frame A for pivotal and adjustable connection therewith. With this in view the frame structure A, according to the embodiment of my invention illustrated in Figs. 1 to 6, inclusive, is adapted to adjustably support a shock absorber 18. This shock absorber may be of any suitable type, such as the well-known hydraulic type, the shock absorber being provided with the forwardly and rearwardly extending actuating shaft 19 to which the inner ends of arms 16 and 17 are connected so that when the connector arms move upwardly and downwardly on displacement of a wheel B, the shock absorber 18 will be actuated by the resulting oscillatory movement of the shaft 19. Thus, shaft 19 forms the pivotal support for the arms of connector 14. My adjusting means for shifting the position of the shock absorber relative to the frame structure A will be presently described.

For convenience of manufacture and assembly, arm 17 may be assembled to arm 16 by the fastener 20 at the outward converged portions of the arms, the resulting wishbone providing a rigid linkage. At the outer end of connector 14 a bracket extension 21 is secured thereto, this bracket having a pivot pin 22 for pivotal connection with the upper end of the arm 13.

Connector 15 is also illustrated as the wishbone type generally similar in form to the upper connector 14. Thus, the lower connector is likewise formed with arms 23 and 24 which, although somewhat longer than the corresponding arms 16 and 17 of connector 14, diverge toward the frame A in generally similar manner for connection therewith by reason of the headed pivot pins 25 and frame brackets 26 which mount the pivot pins. The outer end of the lower connector 15 is also provided with a bracket extension 27 adjustably secured thereto by fastener 28 and the bracket 27 carries the pivot pin 29 for pivotally connecting the lower end of arm 13 to bracket 27.

The vehicle frame structure A and the load carried thereby are yieldingly supported by the wheel supporting means C and connecting means D by reason of suitable springs illustrated at 30 intermediate the frame structure and lower connector 15. If desired, other forms of connectors and springing means may be provided and it is not my intention to limit my invention in its broader aspects to the particular form and arrangement of parts shown herein for purposes of illustration.

Connectors or linkages 14 and 15 cooperate with arm 13 to impart the desired guided movement to the wheel on displacement thereof, the lower connector 15 swinging about its pivots 25 and 29, and the upper connector 14 swinging about its outer pivotal connection 22 with arm 13 and about the axis of the shock absorber actuating shaft 19 at the inner arm of the connector. The steering wheels B are rotated about their respective king pins 12 to effect steering of the vehicle in any well-known manner, a portion of one of the steering arms 31 being shown in Fig. 2.

I will now describe the details of the adjusting means for varying the position of a wheel B, this adjusting means comprising an adjustable connection between each shock absorber 18 and the frame structure A.

A typical mounting for the shock absorbers 18 is best illustrated in Figs. 4, 5 and 6 from which it will be noted that the main body portion of the shock absorber is provided with a base 33 seated on a plate 34 and this plate in turn is seated on the supporting bracket portion 35 of the frame structure A. The shock absorber base 33 is adjustably secured to the frame bracket 35 for movement outwardly of the frame and also for rotative adjustment of the shock absorber to swing the connector 14 forwardly or rearwardly at its outer end. With this in view the base 33 is provided with a downwardly extending stem 36, this stem extending through a cylindrical opening 37 in plate 34 and also through the opening 38 of frame bracket 35, the opening 38 being elongated transversely of the frame structure A or in the general outward direction of the connector 14 as best seen in Fig. 4. The stem 36 is threaded at its lower end to receive a lock nut 39, a lock washer 40 being positioned between the lock nut and frame bracket 35, it being apparent that when the lock nut 39 is drawn tightly against the frame bracket 35, the shock absorber base 33 will be clamped to the frame bracket with the plate 34 securely held intermediate these parts.

Located at the corners of the plate 34 are the bolts 41 which extend upwardly through the frame bracket 35 and through the elongated openings 42 in plate 34 to receive the lock nuts 43 and associated lock washers 44 whereby the plate 34 is adjustably clamped to the frame bracket 35. The slots 42 extend in the direction of the aforesaid slot 38 whereby the plate 34 and shock absorber base 33 may be moved as a unit in the direction of slots 38 and 42 with respect to the frame bracket 35.

The under face of the base 33 is provided with the upwardly shouldered arcuate slots 45 and 46 adapted to receive the heads of the upwardly extending bolts 47, the heads of these bolts being prevented from rotating although they are adapted for adjusting movement in the slots 45 and 46.

The bolts 47 extend upwardly through the reduced portions 48 of the arcuate slots 45 and 46, these bolts also extending upwardly through the cylindrical openings 49 formed in the forwardly and rearwardly projecting bosses 50 of the shock absorber base 33, the bolts 47 being adjustably locked in position by the lock nuts 51 and lock washers 52 associated therewith.

It will be apparent that the bolts 47 adjustably clamp the shock absorber base 33 with the plate 34, the plate 34 being adjustably secured to the frame bracket 35 by reason of the bolt assemblies 41 while the stem 36 and lock nut 39 associated therewith serve to adjustably and securely clamp the shock absorber base 33 and plate 34 to the frame bracket 35.

In the operation of my adjusting means let it be presumed that it is desired to change or vary the camber angle Y' of one of the wheels B. In order to effect such a change, the lock nut 39 associated with stem 36 is backed away from frame bracket 35 for a few turns and also the lock nuts 43 associated with bolts 41 are released from their clamping engagement with the plate 34, it being apparent that under such conditions the shock absorber base 33 together with the plate 34 may be shifted either outwardly or inwardly with respect to the frame structure A whereby to adjust the upper connector 14 as a unit with the shock absorber 18 for swinging the upper end of the arm or knuckle bracket 13 either toward the frame structure A or laterally away from the frame structure, the arm 13 during this adjustment swinging about its lower pivot pin 29.

This lateral adjustment of the shock absorber 18 and upper connector 14 is, of course, in the direction of the elongated slots 38 and 42, the stem 36 being carried with the shock absorber base 33 and plate 34 while the bolts 41 remain fixed with the frame bracket 35. It will be apparent that a lateral outward adjustment of the shock absorber 18 will effect an increase in the camber angle Y' and inward movement will effect a decrease in the camber angle. After the desired adjustment in the camber angle has been obtained, the lock nuts 39 and 43 are again clamped to securely hold the shock absorber base 33 and plate 34 with the frame bracket 35.

In order to effect an adjustment of the caster angle X' of one of the wheels B, the lock nut 39 is released from its clamping position and the lock nuts 51 of the bolts 47 are also released whereupon it will be apparent that with the plate 34 securely held to the frame bracket 35 by the bolts 41, the shock absorber base 33 may be given a rotative movement about the axis of stem 36 in either direction, the bolts 47 being carried in the arcuate slots 45. This rotative adjusting movement of the shock absorber 18 will swing the upper connector 14 either forwardly or rearwardly and likewise swing the arm 13 forwardly or rearwardly about the laterally extending lower pivot pin 28 between the lower connector 15 and the bracket 27. It will furthermore be apparent that a clockwise rotative movement of the shock absorber 18 as viewed in Fig. 2 will cause a rearward movement of the upper end of arm 13 whereby to increase the caster angle X', while a counterclockwise adjustment of the shock absorber will effect a decrease in the caster angle. After the desired adjustment of the caster angle has been effected the lock nuts 39 and 51 are again securely clamped in position to maintain the shock absorber base 33 rigid with the frame bracket 35.

It will be apparent that my adjusting means for caster and camber may be effected independently of each other, or when desired the wheel B may be adjusted for both camber and caster at the same time.

Referring now to the modified embodiment of my invention illustrated in Figs. 7 to 10, inclusive, I have illustrated one of the shock absorbers 18' in association with the inner ends of the arms 16' and 17' of the upper connector 14', it being understood that these parts are intended to be substituted for the shock absorber 18 and upper connector 14 in the previously described embodiment of my invention. In order to simplify the disclosure, I have not duplicated the showing of the remaining part of the wheel suspension as this will be readily understood in the light of the foregoing illustrative detailed description.

In Figs. 7 to 10 I have provided an arrangement of parts wherein the shock absorber 18' is securely clamped to the frame structure of the motor vehicle, the adjustment for caster and camber being obtained by a novel connection between the inner ends of the arms 16' and 17' of the upper connector 14' with the forwardly and rearwardly projecting ends of the oscillating actuating shaft 19' of the shock absorber 18', this shaft as usual being adapted to operate the pistons or other mechanism (not shown) of the shock absorber.

Inasmuch as the connection between each of the connector arms with the actuating shaft 19' is identical, only one of these connections will be described as illustrated in detail in Figs. 8, 9 and 10.

Thus, for example, the inner end of the arm 16' is formed with a cylindrical bearing portion 53 within which is fitted the eccentric bushing 54. This bushing in turn receives the cylindrical sleeve 55 keyed or otherwise non-rotatably fixed at 56 to the rearwardly projecting end of the actuating shaft 19'. Fixed to the eccentric bushing 54 is a stem 56' projecting outwardly through an arcuate slot 57 in the bearing portion 53 and for adjustably clamping the bearing portion and eccentric bushing together I have provided the lock nut 58 and the lock washer 59. For additionally adjustably fixing these parts together the outer circumferential surface of the cylindrical bearing 53 is axially serrated at 60 and the lock washer 59 is correspondingly serrated for selective engagement with the serrations 60 to prevent relative movement between the eccentric bushing 54 and the bearing portion 53 of arm 23'.

The eccentric bushing 54 and the sleeve 55 project forwardly beyond the shaft 19' as best seen in Fig. 8, the bushing and sleeve being provided with matched radially extending openings 62 and 63 respectively, pairs of these openings being adapted to receive the clamping bolt 64 having the threaded lock nut 65 engaging the inner portion of the bolt.

In operation of this modified form of my adjusting means, let it be presumed that it is desired to vary the camber angle Y' of one of the wheels B. In order to effect this adjustment the lock nut 58 is released from its clamping action and the bolt 64 is withdrawn from eccentric bushing 54 and sleeve 55. The same adjustment is also made to the corresponding parts associated with the inner end of the arm 17' of the upper connector 14', the eccentric bushings 54 associated with the connector arms then being given a rotative movement. Normally the eccentric bushings 54 have their eccentric portions extending either downwardly or upwardly, the latter being the arrangement illustrated herein, so that the adjustment will be most effective for a relatively small amount of rotative movement of the eccentric bushings. It will be apparent that when the eccentric bushings are thus adjusted the connector 14' will be shifted as a unit either laterally inwardly or outwardly with respect to the frame structure of a vehicle, depending upon the direction of rotative adjustment imparted to the eccentric bushings. This shifting movement of the upper connector 14' will, as hereinbefore described, swing the upper end of arm 13 about its lower pivot to either increase or decrease the camber angle Y' as will be readily understood. When the desired adjustment for the camber angle has been obtained, the bolt 64 is restored into engagement with the nearest set of openings 62 and 63 and the lock nut 65 is securely clamped in position. The lock nut 58 associated with each of the eccentric bushings is also clamped in place, the arms 16' and 17' being then adjustably and securely locked with the shock absorber actuating shaft 19'.

When it is desired to effect a change in the caster angle X' it will be apparent that the upper end of the arm 13 must be moved forwardly or rearwardly about the lower pivot pin 28 and this adjustment may be effected by rotating one of the eccentric bushings 54 and leaving the other one fixed. Ordinarily there will be sufficient yielding or springing characteristics in the arms of the upper connector 14' to permit this shifting adjustment of the upper end of arm 13 to vary the caster angle X' and if desired the adjustment for the caster angle may be obtained by rotatably adjusting the eccentric bushings 54 in relatively opposite directions, as will be readily understood.

It will be apparent that the adjustment may be effected for camber independently of caster or, when desired, the two adjustments may be made at the same time.

Referring now to the further embodiment of my invention illustrated in Figs. 11 and 12, I have illustrated only a portion of the suspension as hereinbefore explained in connection with the modification in Figs. 7 to 10.

The upper connector 14ᵃ has its arms 16ᵃ and 17ᵃ connected as before to the shock absorber 18ᵃ formed with the shiftable base plate 33ᵃ. This base has elongated slots 42ᵃ similar to the slots 42 and likewise engaged by headed clamping bolts 47ᵃ and lock nuts 51ᵃ. However, in Figs. 11 and 12 I have illustrated only the adjustment for wheel camber, the plate 34 of Fig. 1 being omitted. Thus, the heads of the bolts 47ᵃ engage beneath the frame 35ᵃ.

For facilitating the adjustment of the shock absorber 18ᵃ and wishbone connecter 14ᵃ, the shock absorber has a portion 61 threadedly engaged by an adjusting screw 62 having its head 63 bearing against an abutment bracket 64 secured by rivets 65 to frame 35ᵃ. A lock nut 66 threadedly engages screw 62 and bears against the opposite side of bracket 64. The screw 62 is not threaded in bracket 64 and to prevent longitudinal movement of the screw the latter has an annular slot 67 engaged by the inner end of an abutment screw 68, rotation of screw 62 not being restricted by the abutment screw 68.

In adjusting for wheel camber variation, nuts 51ᵃ and 66 are freely backed away followed by rotative adjustment of screw 62. This causes the shock absorber 18ᵃ to shift, movement thereof being guided by slots 42ᵃ and frame bolts 47ᵃ. After adjustment, the nuts 51ᵃ and 66 are again securely tightened.

I desire to point out that various modifications and changes will be apparent from the teachings of my invention, and I do not limit my invention in its broader aspects to the particular combination and arrangement of parts which I have shown by way of illustrating the principles of my invention.

What I claim is:

1. In a suspension for a steerable ground wheel of a motor vehicle having a frame structure, wheel supporting means including a kingpin, wheel displacement guiding means intermediate the frame structure and said supporting means, said guiding means including an arm member, a shock absorber carried by said frame structure and adapted for actuation by said arm member, a plate on said frame structure, means for adjustably fastening said plate to said frame structure, said shock absorber having a base mounted on said plate, means for adjustably securing said base to said plate, said adjustable means being so constructed and arranged that said shock absorber and plate may be shifted as a unit relative to said frame structure or said shock absorber shifted relative to said plate and frame structure for varying the normal position of said kingpin and wheel.

2. In a suspension for a steerable ground wheel of a motor vehicle having a frame structure, wheel supporting means including a kingpin, wheels displacement guiding means intermediate the frame structure and said supporting means, said guiding means including an arm member, a shock absorber carried by said frame structure and adapted for actuation by said arm member, a plate, means for adjustably securing said plate to said frame structure, means for adjustably securing said shock absorber to said plate, said adjustable means providing for variation in the normal position of said kingpin and wheel.

WILLIAM W. HARRIS.